US 8,261,866 B2
Sep. 11, 2012

(12) United States Patent
Ishida et al.

(54) WHEEL ASSEMBLY WITH IN-WHEEL MOTOR

(75) Inventors: Takeshi Ishida, Aichi-ken (JP); Fumito Kurata, Aichi-ken (JP); Toshiyuki Kobayashi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 905 days.

(21) Appl. No.: 11/866,680

(22) Filed: Oct. 3, 2007

(65) Prior Publication Data

US 2008/0083572 A1 Apr. 10, 2008

(30) Foreign Application Priority Data

Oct. 4, 2006 (JP) .................................. 2006-273292

(51) Int. Cl.
*B60K 7/00* (2006.01)
(52) U.S. Cl. .................... 180/65.6; 180/65.51
(58) Field of Classification Search ............... 180/65.1, 180/65.51, 65.6; 310/52, 58, 60 R, 62, 63
See application file for complete search history.

(56) References Cited

U.S. PATENT DOCUMENTS

| 3,635,597 | A | * | 1/1972 | Marten ........................ 417/568 |
| 3,770,074 | A | * | 11/1973 | Sherman ..................... 180/65.6 |
| 3,857,461 | A | * | 12/1974 | Schmitt .......................... 184/6.2 |
| 4,330,045 | A | * | 5/1982 | Myers ........................ 180/65.51 |
| 4,432,693 | A | * | 2/1984 | Hackbart ....................... 415/88 |
| 4,799,564 | A | * | 1/1989 | Iijima et al. .............. 180/65.51 |
| 4,875,741 | A | * | 10/1989 | Ozawa et al. .............. 303/116.4 |
| 4,930,590 | A | * | 6/1990 | Love et al. ..................... 180/55 |
| 5,087,229 | A | * | 2/1992 | Hewko et al. ............... 475/149 |
| 5,156,579 | A | * | 10/1992 | Wakuta et al. ............... 475/161 |
| 5,180,180 | A | * | 1/1993 | Yamashita et al. ........... 180/253 |
| 5,330,335 | A | * | 7/1994 | Teracuhi et al. ............. 418/55.6 |
| 5,476,373 | A | * | 12/1995 | Mantooth et al. .............. 418/32 |
| 5,901,802 | A | * | 5/1999 | Sunohara et al. ............ 180/65.6 |
| 6,100,615 | A | * | 8/2000 | Birkestrand ................ 310/75 C |
| 2005/0045393 | A1 | * | 3/2005 | Mizutani et al. ............ 180/65.5 |

FOREIGN PATENT DOCUMENTS

| DE | 41 18 729 A1 | 5/1992 |
| JP | 55-14964 | 2/1980 |
| JP | 61-73091 | 5/1986 |
| JP | 2-11419 | 1/1990 |
| JP | 5-169985 | 7/1993 |
| JP | 5-61466 | 8/1993 |
| JP | 8-219028 | 8/1996 |
| JP | 9-144649 | 6/1997 |
| JP | 10-54373 | 2/1998 |
| JP | 2000-46157 | 2/2000 |
| JP | 2001-32914 | 2/2001 |

(Continued)

*Primary Examiner* — Frank Vanaman
(74) *Attorney, Agent, or Firm* — Oblon, Spivak, McClelland, Maier & Neustadt, L.L.P.

(57) ABSTRACT

A wheel assembly with an in-wheel motor in which a wheel driving apparatus formed of a motor or a combination of a motor and a reduction mechanism is provided in a wheel, includes an oil supply apparatus that is driven by rotational output of the motor, and an oil supply flow path that leads oil that has been drawn up by the oil supply apparatus to the wheel driving apparatus. The oil supply apparatus is structured so that oil can be supplied to the wheel driving apparatus via the oil supply flow path when the motor is rotating in the forward direction as well as when the motor is rotating in the reverse direction.

20 Claims, 9 Drawing Sheets

VEHICLE OUTSIDE ← → VEHICLE INSIDE

FOREIGN PATENT DOCUMENTS

| | | |
|---|---|---|
| JP | 2001-173762 | 6/2001 |
| JP | 2005-73364 | 3/2005 |
| JP | 2005-80397 | 3/2005 |
| JP | 2005-237176 | 9/2005 |
| JP | 2005-278277 | 10/2005 |
| JP | 2005-335623 | 12/2005 |
| JP | 2006-105029 | 4/2006 |
| JP | 2006-197772 | 7/2006 |
| JP | 2006-248273 | 9/2006 |

* cited by examiner

VEHICLE OUTSIDE ←——→ VEHICLE INSIDE

VEHICLE OUTSIDE ←——→ VEHICLE INSIDE

F I G . 6
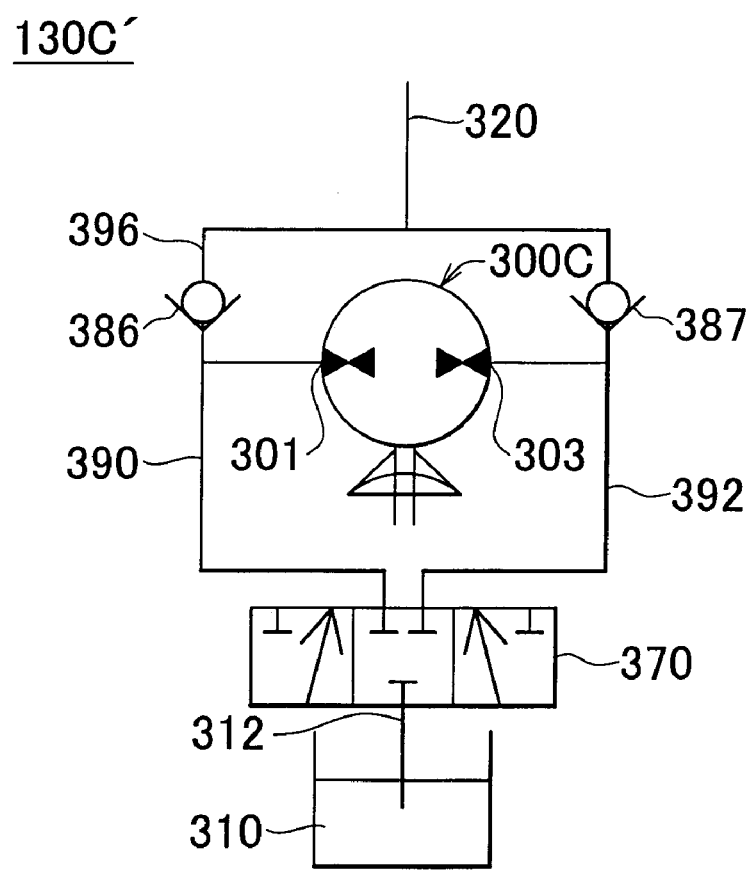

VEHICLE OUTSIDE ⟷ VEHICLE INSIDE

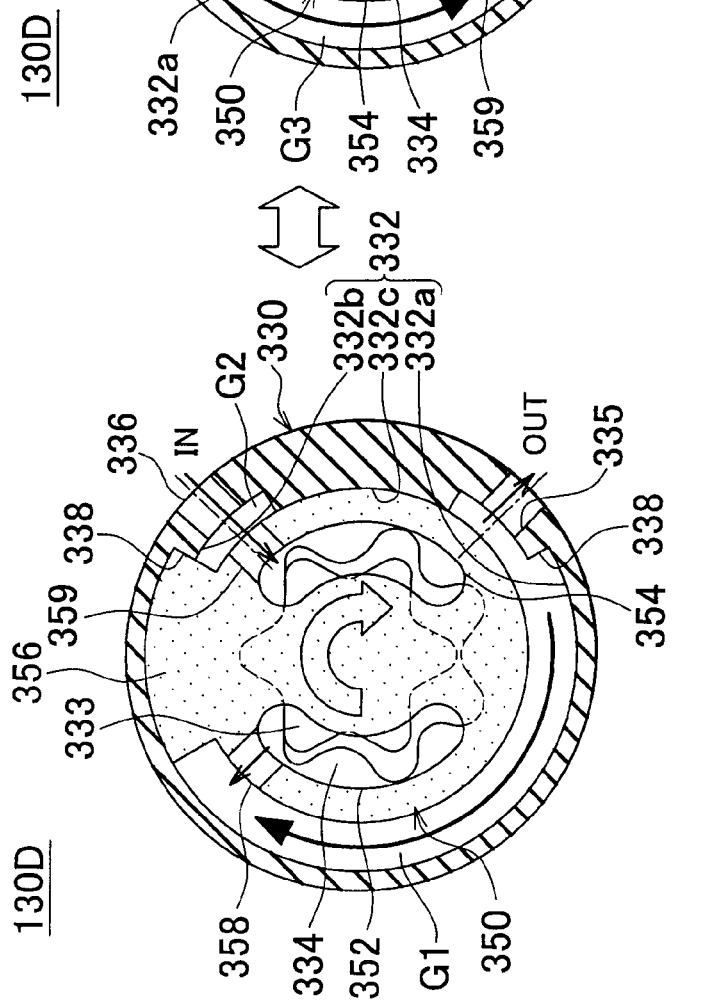

WHEEL ASSEMBLY WITH IN-WHEEL MOTOR

INCORPORATION BY REFERENCE

The disclosure of Japanese Patent Application No. 2006-273292 filed on Oct. 4, 2006, including the specification, drawings and abstract is incorporated herein by reference in its entirety.

BACKGROUND OF THE INVENTION

1. Field of the Invention

The invention relates to a wheel assembly with an in-wheel motor, which includes both a wheel driving apparatus formed of a motor or a combination of a motor and a reduction mechanism, and an oil supply apparatus that is driven by rotational output of the motor.

2. Description of the Related Art

Japanese Patent Application Publication No. 2005-73364 (JP-A-2005-73364), for example, describes a related wheel assembly with an in-wheel motor, which includes a motor, a rotating shaft that rotates according to output torque of the motor, an oil pump provided at one end of the rotating shaft, and an oil passage that supplies oil from the oil pump to an outer periphery of a stator core of the motor. In this wheel assembly with an in-wheel motor, the oil is supplied from the outer periphery of the stator core of the motor to cool the stator core and stator coil, after which it is used to lubricate bearings that support the shafts of the motor and a reduction gear.

Vehicles run backward as well as forward so in the wheel assembly with an in-wheel motor which is provided with an oil supply apparatus that is driven by rotational output of the motor, oil is preferably able to be supplied for cooling and/or lubricating the wheel driving apparatus during both forward (i.e., normal) rotation and reverse rotation of the motor.

With regard to this, as described in JP-A-2005-73364, the oil supply apparatus, which is structured taking into account only forward running of the vehicle, i.e., only forward rotation of the motor, may not be able to suitably supply oil to cool and/or lubricate the wheel driving apparatus when the vehicle is running in reverse, i.e., when the motor is operating in reverse.

SUMMARY OF THE INVENTION

This invention thus provides a wheel assembly with an in-wheel motor, which is capable of suitably supplying oil for cooling and/or lubricating a wheel driving apparatus when a motor is operating in reverse as well as forward.

A first aspect of the invention relates to a wheel assembly with an in-wheel motor in which a wheel driving apparatus formed of a motor or a combination of a motor and a reduction mechanism is provided in a wheel. This wheel assembly with an in-wheel motor includes an oil supply apparatus that is driven by rotational output of the motor. The oil supply apparatus is formed such that oil in an oil tank is supplied to the wheel driving apparatus when the motor is rotating in a forward direction as well as when the motor is rotating in a reverse direction. Accordingly, oil can be supplied to the wheel driving apparatus when the motor is rotating in the reverse direction as well as when the motor is rotating in the forward direction. In this aspect, the oil supply apparatus may include a pump device that has a rotating member that rotates in conjunction with the forward rotation and the reverse rotation of the motor. This pump device functions as a pump irrespective of whether the rotating member is rotating in the forward direction or the reverse direction so oil can be supplied to the wheel driving apparatus when the motor is rotating in the reverse direction as well as when the motor is rotating in the forward direction.

In the wheel assembly with an in-wheel motor according to this aspect, the oil supply apparatus may include a piston pump.

In the wheel assembly with an in-wheel motor according to this structure, the piston pump may include an eccentric cam that is rotatably driven by rotational output of the motor, and a piston that moves in a reciprocating manner in conjunction with the rotation of the eccentric cam.

In the wheel assembly with an in-wheel motor according to the foregoing aspect, the oil supply apparatus may include a centrifugal pump.

In the wheel assembly with an in-wheel motor according to this structure, the oil supply apparatus may include a pump that discharges oil in one direction when the motor is rotating in the forward direction and discharges the oil in another direction when the motor is rotating in the reverse direction, two systems of flow paths corresponding to the different directions in which the pump discharges the oil, and a communication control apparatus that controls the communicating state of the two systems of flow paths with respect to the pump. As a result, oil can be supplied to the wheel driving apparatus regardless of whether the motor is rotating in the forward direction or the reverse direction even when using an oil pump in which the direction of oil discharge is different when the motor rotates in the forward direction than it is when the motor rotates in the reverse direction.

In the wheel assembly with an in-wheel motor according to the foregoing structure, a first system from among the two systems of flow paths may include an outlet side connecting flow path that communicates an outlet port of the pump during forward rotation with the oil supply flow path to the wheel driving apparatus, and an inlet side connecting flow path that communicates an inlet port of the pump during forward rotation with the oil tank. A second system from among the two systems of flow path may include an outlet side connecting flow path that communicates an outlet port of the pump during reverse rotation with the oil supply flow path, and an inlet side connecting flow path that communicates an inlet port of the pump during reverse rotation with the oil tank. The communication control apparatus may include four check valves, one for each of the two outlet side connecting flow paths and one for each of the two inlet side connecting flow paths.

In the wheel assembly with an in-wheel motor according to the foregoing structure, a first system from among the two systems of flow paths may include an outlet side connecting flow path that communicates an outlet port of the pump during forward rotation with the oil supply flow path to the wheel driving apparatus, and an inlet side connecting flow path that communicates an inlet port of the pump during forward rotation with the oil tank. A second system from among the two systems of flow paths may include an outlet side connecting flow path that communicates an outlet port of the pump during reverse rotation with the oil supply flow path, and an inlet side connecting flow path that communicates an inlet port of the pump during reverse rotation with the oil tank. The communication control apparatus may include a check valve provided for each of the two outlet side connecting flow paths, and a directional control valve that selectively communicates one of the two inlet side connecting flow paths with the oil tank.

In the wheel assembly with an in-wheel motor according to the foregoing aspect, the oil supply apparatus may include a pump that discharges oil in one direction when the motor is rotating in the forward direction and discharges the oil in another direction when the motor is rotating in the reverse direction. The pump may include a movable port member that defines an outlet port and an inlet port, and the movable port member may move, in conjunction with the forward rotation and the reverse rotation of the motor, between a first position and a second position in which the outlet port and the inlet port are reversed. That is, the movable port member moves to a first position when the motor rotates in one of the forward direction and the reverse direction, and moves to a second position in which the outlet port and the inlet port are reversed with respect to the first position when the motor rotates in the other of the forward direction and the reverse direction. As a result, oil can be supplied to the wheel driving apparatus regardless of whether the motor is rotating in the forward direction or the reverse direction even when using an oil pump in which the direction of oil discharge is different when the motor rotates in the forward direction than it is when the motor rotates in the reverse direction.

In the wheel assembly with an in-wheel motor according to this structure, the pump may be a gear pump, the movable port member may be arranged on a gear side surface of the gear pump and move between the first position and the second position in conjunction with the forward rotation and reverse rotation of the motor via friction between the movable port member and the gear side surface of the gear pump, and the pump may include a restricting portion that restricts the movement of the movable port member to the first position and the second position.

In the wheel assembly with an in-wheel motor according to foregoing structure, the pump may include a fixed case in which are formed an outlet hole that is connected to the oil supply flow path to the wheel driving apparatus and an inlet hole that is communicated with the oil tank, the movable port member may be arranged within the case, and the movable port member and the case may be structured such that the outlet port defined by the movable port member is communicated with the outlet hole of the case and the inlet port defined by the movable port member is communicated with the inlet hole of the case when the movable port member is in the first position as well as the second position.

According to the invention, it is possible to obtain a wheel assembly with an in-wheel motor, which is capable of suitably supplying oil for cooling and/or lubricating a wheel driving apparatus when a motor is operating in reverse as well as forward.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a view schematically showing the structure of an oil supply apparatus according to a modified example of the third example embodiment;

FIGS. 9A and 9B are plan views of the structure and operation of an oil pump into which the movable port member has been incorporated.

DETAILED DESCRIPTION OF THE EMBODIMENTS

In the following description and the accompanying drawings, the present invention will be described in more detail in terms of example embodiments.

[First Example Embodiment]

Figure 1:
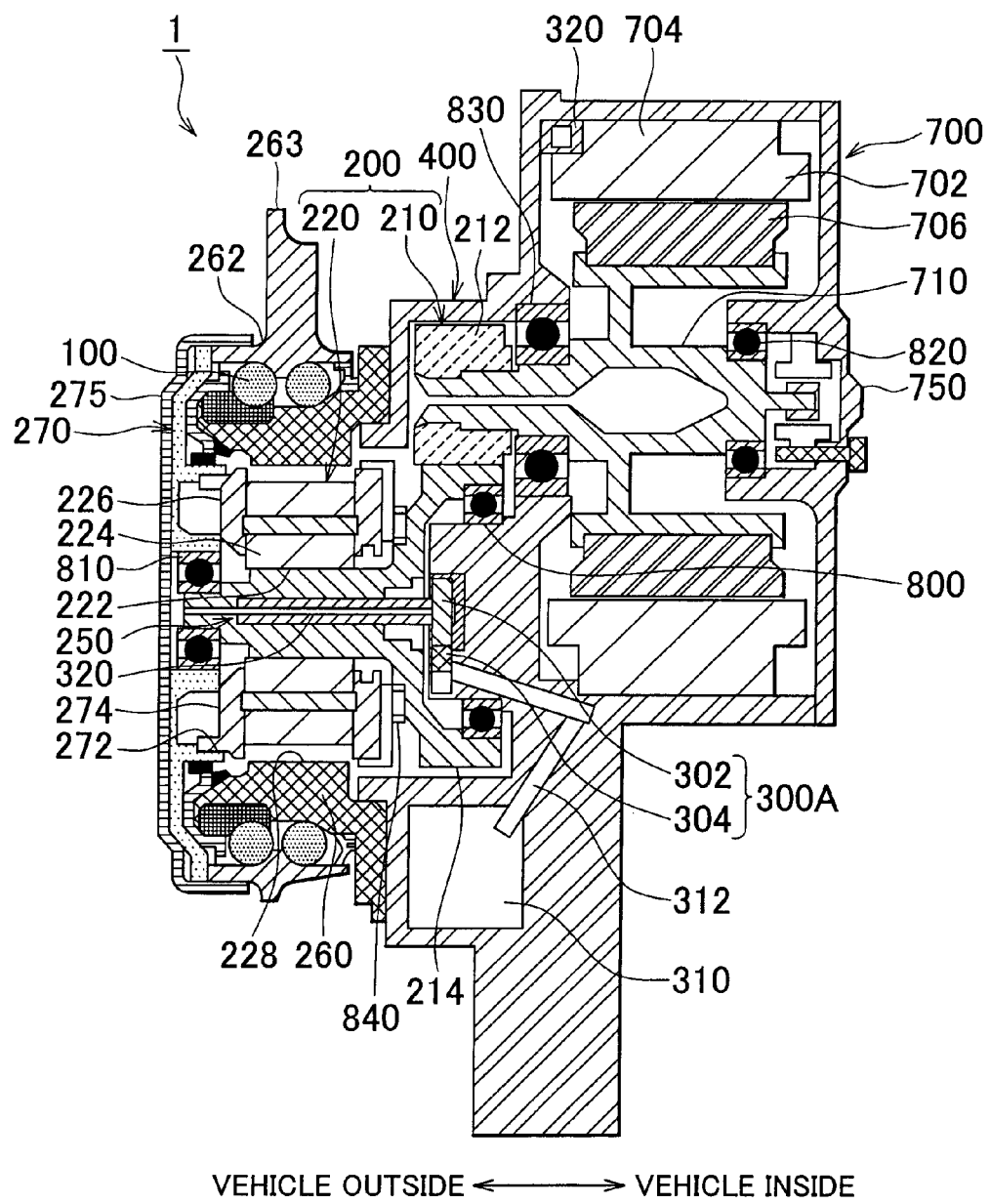
FIG. 1 is a sectional view of the main structure of a wheel assembly with an in-wheel motor according to a first example embodiment of the invention.

FIG. 1 is a sectional view of the main structure of a wheel assembly 1 with an in-wheel motor according to a first example embodiment of the invention. In the drawing, only the main structure arranged within the wheel is shown. The tire and the wheel itself are omitted from the drawing.

In the following description, the words "inside of the tire/wheel assembly" refer to the generally columnar space that is enclosed by the rim inner peripheral surface of the wheel. However, expressions such as "a part is arranged inside the tire/wheel assembly" do not always mean that the entire part is housed completely within this generally columnar space. They also include structures in which a portion of the part partially protrudes from within that generally columnar space.

A motor 700 is arranged in a space on the vehicle inside within the tire/wheel assembly. As shown in FIG. 1, the motor 700 is arranged offset upward and forward with respect to the axle center.

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above. The output shaft 710 is rotatably supported by a motor cover 750 via a bearing 820 on the vehicle inside in the tire/wheel assembly, as well as rotatably supported by the knuckle 400 via a bearing 830 on the outer side of the vehicle in the vehicle width direction (hereinafter also referred to as simply "vehicle outside") in the tire/wheel assembly. The bearings 820 and 830 may be radial ball bearings which use balls as rolling bodies, such as single-row, deep-grooved ball bearings, for example.

The rotational output of the motor 700 is transmitted to the wheel via the reduction mechanism 200. The reduction mechanism 200 is a twin shaft reduction mechanism which includes a counter gear mechanism 210 and a planetary gear set 220.

As shown in FIG. 1, the counter gear mechanism 210 is arranged farther to the vehicle outside than the motor 700. The counter gear mechanism 210 includes a small diameter driving gear 212 which is arranged on the output shaft 710 of the motor 700, and a large diameter driven gear (i.e., a counter gear) 214 that is in mesh with the driving gear 212. The small diameter driving gear 212 is spline fitted to the output shaft 710 of the motor 700 from the vehicle outside, and thus integrated with the output shaft 710. The large diameter counter gear 214 has the axle center as its rotational center.

As shown in FIG. 1, the planetary gear set 220 is arranged farther to the vehicle outside than the counter gear mechanism 210 within the tire/wheel assembly. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 1, the sun gear 222 is formed on one end side of a shaft (i.e., sun gear shaft) 250 and the counter gear 214 is formed on the other end side of the shaft 250 in the width direction of the vehicle. More specifically, the shaft 250 has a rotational center that is on the same axis as the axle center. The sun gear 222 is positioned on the peripheral surface of the end portion on the vehicle outside, and the counter gear 214 is positioned on the peripheral surface of the end portion on the vehicle inside. The end portion of the shaft 250 on the vehicle inside is rotatably supported by the knuckle 400 via a bearing 800, and the end portion of the shaft 250 on the vehicle outside is rotatably supported by a disc-shaped power transmitting member 270 via a bearing 810. The sun gear 222 and the counter gear 214 may also be formed as separate parts, in which case they may be connected using splines. Also, the bearings 800 and 810 may be radial ball bearings which use balls as rolling bodies, such as single-row, deep-grooved ball bearings, for example. Further, as shown in FIG. 1, the bearing 800 may be incorporated inside (i.e., on the inner peripheral side of) the counter gear 214, and a convex portion 412 of the knuckle 400 connected by press-fitting or the like to the inner race side of the bearing 800.

The planetary gear 224 is in mesh with the sun gear 222 on the inner peripheral side and in mesh with the ring gear 228 on the outer peripheral side. The planetary gear 224 is rotatably supported by the planetary carrier 226 via a roller bearing 225. The rotational center of the planetary carrier 226 is the same as the axle center. The planetary carrier 226 is supported at the vehicle inside within the tire/wheel assembly by the shaft 250 via a thrust cylindrical roller bearing 840, and is spline fitted at the vehicle outside to a circumferential groove 272 formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260 and crimping it thereto.

An outer race side member 262 is arranged so as to surround the inner race side member 260 from the outer peripheral side. The inner peripheral surface of the outer race side member 262 forms an outer race of the axle bearing 100.

The power transmitting member 270 is a disc-shaped member provided so as to cover the vehicle outside of the reduction mechanism. The circumferential groove 272 to which the vehicle outside end portion (peripheral wall portion) of the planetary carrier 226 is spline fitted is formed on the vehicle inside of the power transmitting member 270. The outer peripheral edge of the power transmitting member 270 is connected to the end portion on the vehicle outside of the outer race side member 262 by crimping or the like. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole for fastening a hub bolt, not shown, is formed in this flange portion 263. The outer race side member 262 is fastened together with a brake disc, not shown, by the hub bolt to the wheel with the inner peripheral portion of the brake disc, not shown, being sandwiched between the flange portion 263 and the wheel. A cover 275 is provided on the vehicle outside of the power transmitting member 270 so as to cover the vehicle outside of the power transmitting member 270.

In the foregoing structure, when the rotor 706 of the motor 700 rotates in response to a command from a vehicle control apparatus, not shown, the small diameter driving gear 212 of the counter gear mechanism 210 rotates, and as it does so, the large diameter counter gear 214 that is in mesh with the driving gear 212 rotates, thus realizing a first reduction. When the counter gear 214 rotates, the sun gear 222, which is integral with the counter gear 214, also rotates. As a result, the planetary gears 224 rotate while revolving around the sun gear 222. This rotation realizes a second reduction. The revolving motion of the planetary gears 224 is output by the planetary carrier 226 and transmitted to the power transmitting member 270 which is spline fitted to the planetary carrier 226. The tire/wheel assembly is driven as the outer race side member 262, the brake disc, and the wheel all rotate together with the power transmitting member 270.

A suspension arm, not shown, is connected to the knuckle 400 via a ball joint. Also, a spring and an absorber, not shown, are provided between the vehicle body and the suspension arm (e.g., a lower arm). As a result, input from the tire/wheel assembly to the vehicle body is reduced. The spring may be any type of spring coil or air spring. Also, the absorber may not only be a hydraulic absorber that applies damping action to vertical input, but also a rotary electromagnetic absorber that applies damping action to rotational input. Further, when the wheel is a steered wheel, a tie-rod, not shown, is connected to the knuckle 400 via a ball joint.

An oil tank 310 is formed below the knuckle 400 and is arranged below, along a vertical line that is orthogonal to, the axle center in the tire/wheel assembly 10, as shown in FIG. 1. A lower end portion of a suction path 312 formed in the knuckle 400 is connected to the oil tank 310. The oil tank 310 serves to collect oil for cooling the motor 700 or lubricating the reduction mechanism 200.

An oil pump 300A is arranged between the motor 700 and the planetary gear set 220 of the reduction mechanism 200 in the width direction of the vehicle. More specifically, the oil pump 300A is provided on the vehicle inside end portion of the shaft 250. In the example shown in FIG. 1, the oil pump 300A is arranged inside the knuckle 400 to the inside of the counter gear 214 in the radial direction.

The oil pump 300A is driven by rotational output of the motor 700. When operating, the oil pump 300A draws oil up from inside the oil tank (reservoir tank) 310 via the suction path 312. The oil that is drawn in through an inlet port is then discharged from an outlet port mainly to an oil supply flow path 320. While the route of the oil supply flow path 320 will not be described in detail here, the oil in the oil supply flow path 320 formed inside the shaft 250 is supplied to the bearing 810, and supplied to the planetary gears 224 via oil holes, not shown, by centrifugal force generated as the shaft 250 rotates, for example. The oil supplied in this way is used to lubricate the bearing 810 as well as the roller bearings which are at the rotational centers of the planetary gears 224. Further, the oil from the oil pump 300A is used to cool the stator coil 704 and lubricate the bearings 800, 820, and 830 via the oil supply flow path 320 formed in the circumferential direction around the coil end using the space near the coil end of the stator coil 704. The oil used for cooling or lubrication in this way is then finally returned to the oil tank 310 by gravity.

The oil pump 300A in this example embodiment is a piston pump which includes an eccentric cam 302 that is rotatably driven by rotational output of the motor 700, and a piston 304 that moves in a reciprocating manner in conjunction with the rotation of the eccentric cam 302. The eccentric cam 302 is connected to the vehicle inside end portion of the shaft 250 on which the counter gear 214 is provided, and thus rotates as the shaft 250 rotates.

Figure 2A:
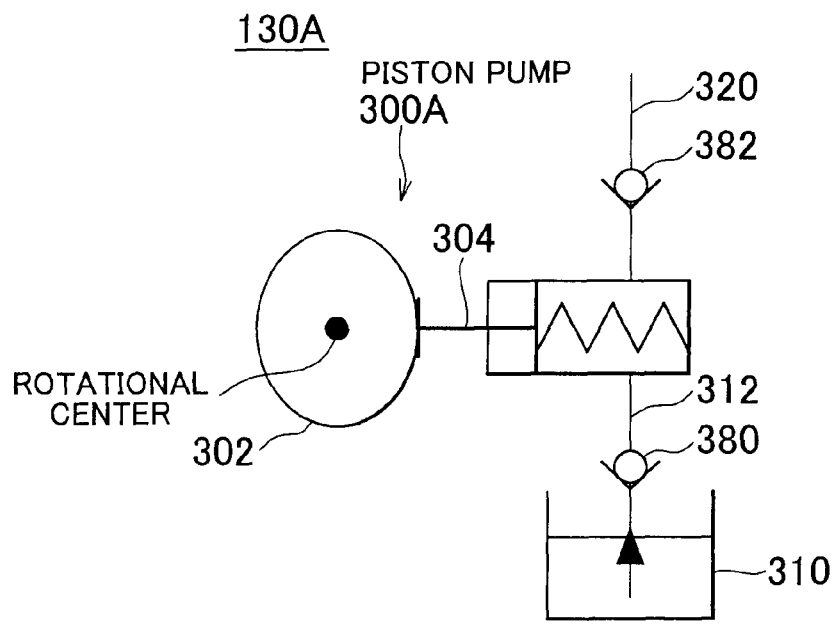
FIGS. 2A and 2B are views schematically showing the structure and operation of an oil supply apparatus according to the first example embodiment.
Figure 2B:
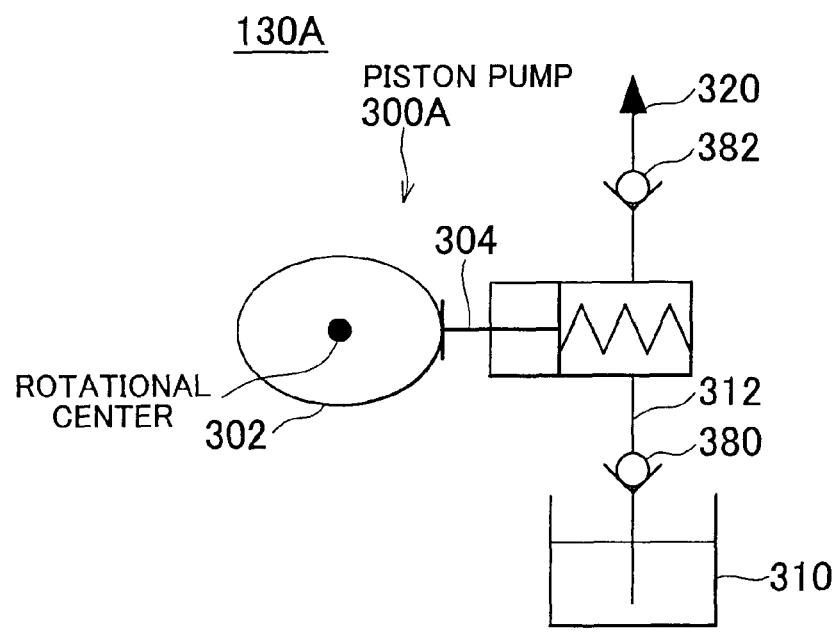

FIGS. 2A and 2B are views schematically showing the structure and operation of an oil supply apparatus 130A according to the first example embodiment.

The oil supply apparatus 130A according to the first example embodiment includes the oil pump 300A described above and two check valves 380 and 382.

As shown schematically in FIGS. 2A and 2B, the check valve 380 is provided between the suction path 312 and the inlet port of the oil pump 300A. The check valve 380 is a one-way valve that allows oil to flow only in the direction from the oil tank 310 toward the oil pump 300A. Similarly, the check valve 382 is provided downstream of the outlet port of the oil pump 300A, also as shown schematically in FIGS. 2A and 2B. The check valve 382 is also a one-way valve that allows oil to flow only in the direction from the oil pump 300A toward the motor 700 and the reduction mechanism 200 via the oil supply flow path 320. Incidentally, the eccentric cam 302 shown is elliptical but it may also have another cam profile such as triangular.

Next, the operation of the oil supply apparatus 130A will be described.

As shown in FIG. 2A, when the oil pump 300A is operating, i.e., when the motor 700 is running, oil inside the oil tank 310 is drawn up via the suction path 312 and into a cylinder chamber through an inlet port, not shown, as the eccentric cam 302 rotates and the volume of the cylinder, which is defined by the piston 304, increases. Then, as shown in FIG. 2B, as the eccentric cam 302 continues to rotate such that the volume of the cylinder decreases, the oil in the cylinder chamber is discharged from the outlet port toward the motor 700 and the reduction mechanism 200 via the oil supply flow path 320. That is, oil is supplied to the motor 700 and the reduction mechanism 200.

Because the vehicle travels both forward and backward, the oil supply apparatus 130A that is provided with the oil pump 300A which is driven by rotational output of the motor 700, as described above, is preferably able to supply oil to the motor 700 and the reduction mechanism 200 when the motor 700 is rotating in the reverse direction (i.e., reverse rotation) as well as when the motor 700 is rotating in the forward direction (i.e., normal rotation).

With respect to this, in the first example embodiment, the oil supply apparatus 130A described above operates regardless of the direction of rotation of the motor 700. That is, regardless of whether the motor 700 is rotating in the forward direction (corresponding to forward travel of the vehicle) or in the reverse direction corresponding to reverse travel of the vehicle), the direction in which oil is discharged from the piston type oil pump 300A does not change so oil is able to be stably supplied.

In the first example embodiment described above, using a piston pump as the oil pump 300A enables the necessary oil to be stably supplied to the motor 700 and the reduction mechanism 200 regardless of whether the motor 700 is rotating in the forward direction or in the reverse direction.

Incidentally, in the first example embodiment, as long as the oil pump 300A is a piston pump, it is not limited to being a radial piston pump as is illustrated, but may also be an axial piston pump which includes a swash plate that is integrally mounted to the shaft 250. Also, the number of pistons 304 is arbitrary and not limited to a single piston 304 as is illustrated. For example, two or more radial pistons 304 may be provided for a single eccentric cam 302, or one or more pistons 304 may be provided for two or more eccentric cams 302.

[Second Example Embodiment]

Figure 3:
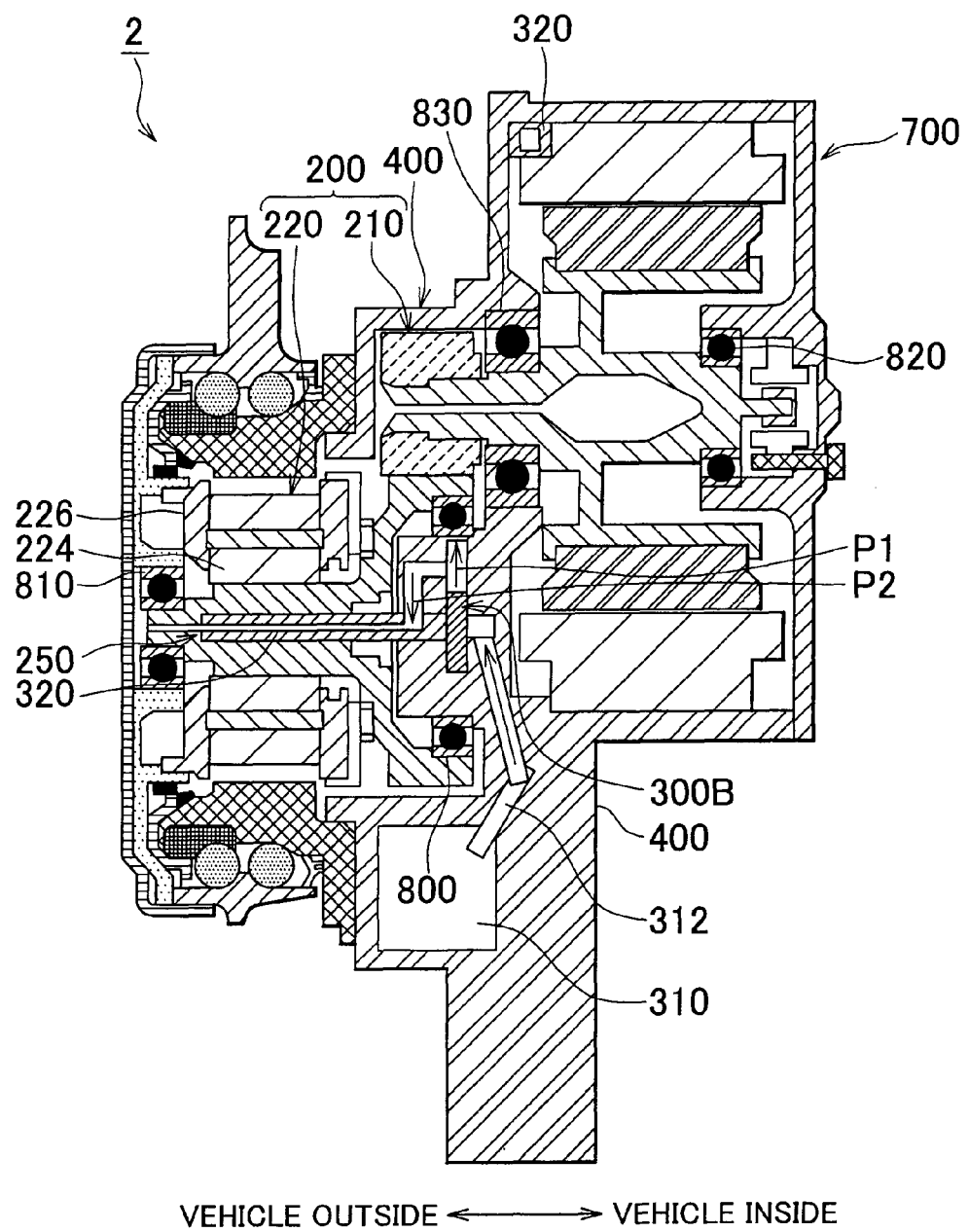
FIG. 3 is a sectional view of the main structure of a wheel assembly with an in-wheel motor according to a second example embodiment of the invention.

FIG. 3 is a sectional view of the main structure of a wheel assembly 2 with an in-wheel motor according to a second example embodiment of the invention. This second example embodiment differs from the first example embodiment described above mainly in that an oil pump 300B is a centrifugal pump. In the wheel assembly 2 with an in-wheel motor according to the second example embodiment, the structure other than the oil pump 300B and the constituent elements related to the oil pump 300B is the same as is described in the foregoing first example embodiment. Accordingly, the constituent elements in the second example embodiment that are the same as those in the first example embodiment will be denoted by the same reference numerals and descriptions of those elements will be omitted.

The oil pump 300B is a centrifugal pump which is driven by rotational output of the motor 700. When operating, the oil pump 300B draws up oil from the oil tank 310 via the suction path 312. The oil that is drawn in through an inlet port 360 (see FIG. 4) is then discharged from an outlet port 368 (see FIG. 4) to the oil supply flow path 320. The oil supply flow path 320 includes a flow path toward the motor 700 side and a flow path toward the reduction mechanism 200 side, as shown by arrows P1 and P2 in FIG. 3. While the route of the oil supply flow path 320 will not be described in detail here, the flow path toward the reduction mechanism 200 side, for example, includes a portion of the oil supply flow path 320 that is formed inside the shaft 250 and supplies oil to the bearing 810, as well as supplies oil to the planetary gears 224 via oil holes, not shown, by centrifugal force generated as the shaft 250 rotates. The oil supplied in this way is used to lubricate the bearing 810, as well as the roller bearings at the rotational center of the planetary gears 224. Further, the flow path toward the motor 700 side includes a portion of the oil supply flow path 320 that is provided along the periphery around the coil end using the space near the coil end of the stator coil 704, and supplies oil to the stator coil 704 and the bearings 800, 820, and 830. The oil used for cooling the stator coil 704 and lubricating the bearings 800, 820, and 830 in this way is then finally returned to the oil tank 310 by gravity.

Figure 4A:
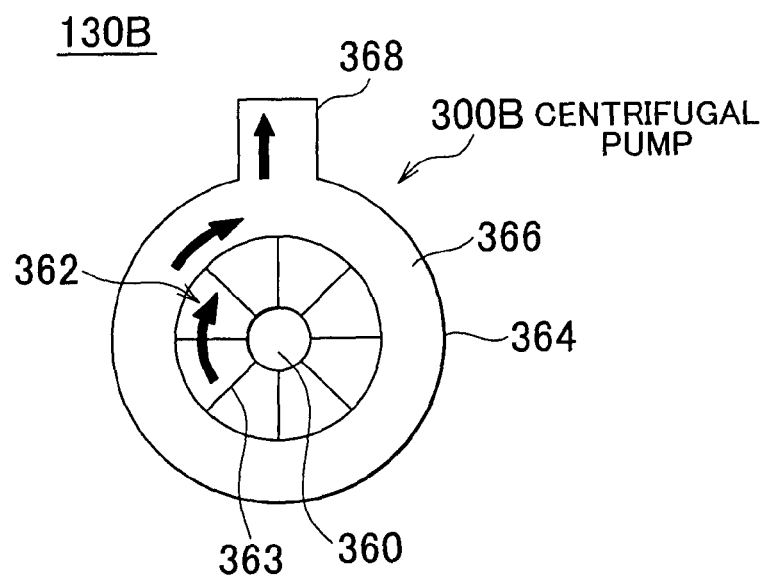
FIGS. 4A and 4B are views schematically showing the structure and operation of an oil pump according to the second example embodiment.
Figure 4B:
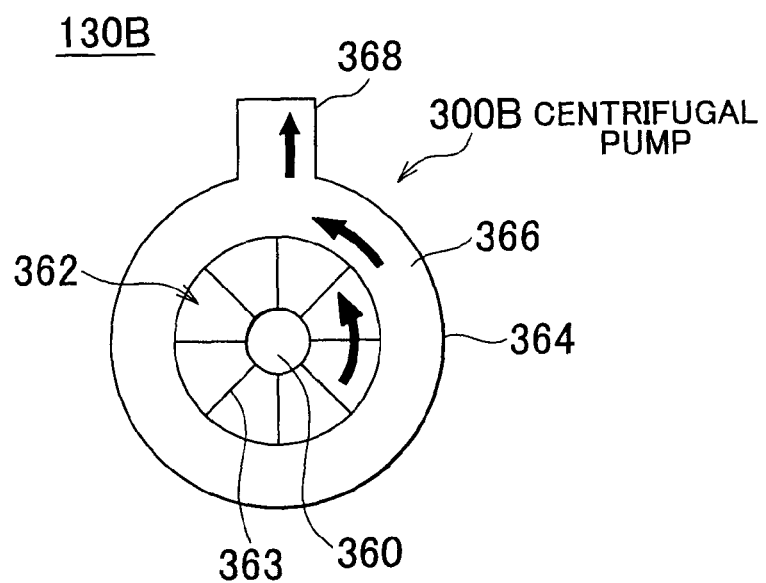

FIGS. 4A and 4B are views schematically showing the structure and operation of the oil pump 300B of an oil supply apparatus 130B according to the second example embodiment. In FIGS. 4A and 4B, the oil pump 300B is a schematic elevation (i.e., as viewed along the axle). Incidentally, the oil supply apparatus 130B according to the second example embodiment may also include check valves 380 and 382 like those described in the foregoing first example embodiment, in addition to the oil pump 300B.

The oil pump 300B is provided with a generally cylindrical case 364, as shown in FIGS. 4A and 4B. This case 364 includes an intake port 360 formed near the center, and an outlet port 368 formed in the radial direction in the peripheral wall. The space inside the case 364 is essentially closed off except for the intake port 360 and the outlet port 368. A rotating body 362 on which a plurality of fins 363 are formed is provided in the case 364. This rotating body 362 is connected to the vehicle inside end portion of the shaft 250 and thus rotates together with the shaft 250. That is, the rotating body 362 is driven by the same shaft that the counter gear 214 is provided on. The fins 363 of the rotating body 362 may extend in a spiral in the radial direction around the inlet port 360, or they may extend in the radial direction straight out from the inlet port 360. In the latter case, as long as the rotation speed is the same, oil with approximately the same flowrate can be supplied when the motor 700 is rotating in the reverse direction as can be supplied when the motor 700 is rotating in the forward direction. Also, the width in the radial direction of a circular passage 366 between the rotating body 362 and the side wall of the case 364 may be formed asymmetrical with respect to the outlet port 368, or it may be formed symmetrical with respect to the outlet port 368 as shown in FIGS. 4A and 4B. In the latter case, as long as the rotation speed is the same, oil with approximately the same flowrate can be supplied when the motor 700 is rotating in the reverse direction as can be supplied when the motor 700 is rotating in the forward direction. Incidentally, the case 364 may be formed as a separate member from the knuckle 400 and then incorporated into the knuckle 400, or it may be formed by the knuckle 400 itself. In the latter case, a generally cylindrical concave portion (i.e., a cavity) defining the case 364 may be formed in the knuckle 400, the inlet port 360 and the outlet port 368 may be formed, and the rotating body 362 may be arranged in the concave portion.

As shown in FIG. 4A, when the motor 700 is rotating in the forward direction, centrifugal force and the fins 363 of the rotating body 362 cause the oil that is drawn up through the central inlet port 360 as the rotating body 362 rotates (this rotation is in the clockwise direction in this example) to flow clockwise in the circumferential direction through the circular passage 366 and then be discharged through the outlet port 368, as shown by the arrows in FIG. 4A.

Also, as shown in FIG. 4B, when the motor 700 is rotating in the reverse direction, centrifugal force and the fins 363 of the rotating body 362 cause the oil that is drawn up through the central inlet port 360 as the rotating body 362 rotates (this rotation is in the counterclockwise direction in this example) to flow counterclockwise in the circumferential direction through the circular passage 366 and then be discharged through the outlet port 368, as shown by the arrows in FIG. 4B.

According to the second example embodiment described above, the oil pump 300B is a centrifugal pump so the direction in which oil is discharged is the same when the motor 700 is rotating in the forward direction, as is shown in FIG. 4A, as it is when the motor 700 is rotating in the reverse direction, as is shown in FIG. 4B. Accordingly, the necessary oil can be stably supplied to the motor 700 and the reduction mechanism 200 regardless of whether the motor 700 is rotating in the forward direction or the reverse direction.

[Third Example Embodiment]

Figure 5A:
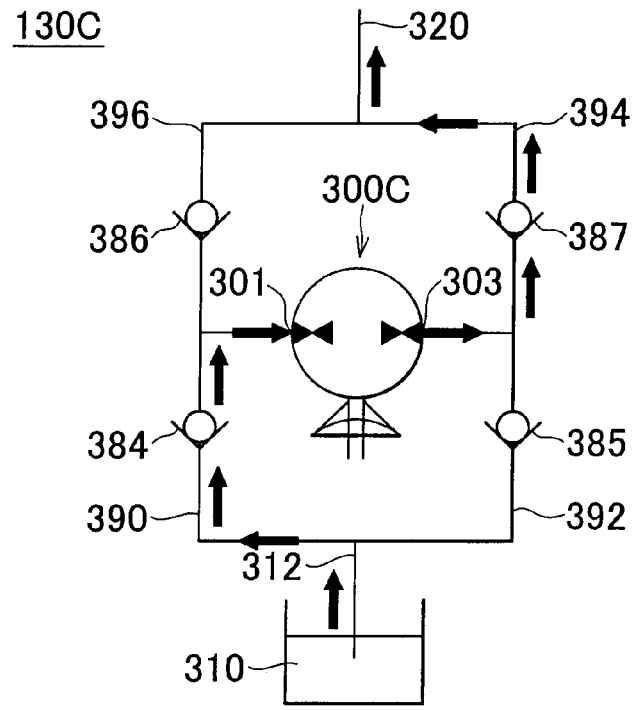
FIGS. 5A and 5B are views schematically showing the structure and operation of an oil supply apparatus according to a third example embodiment of the invention.
Figure 5B:
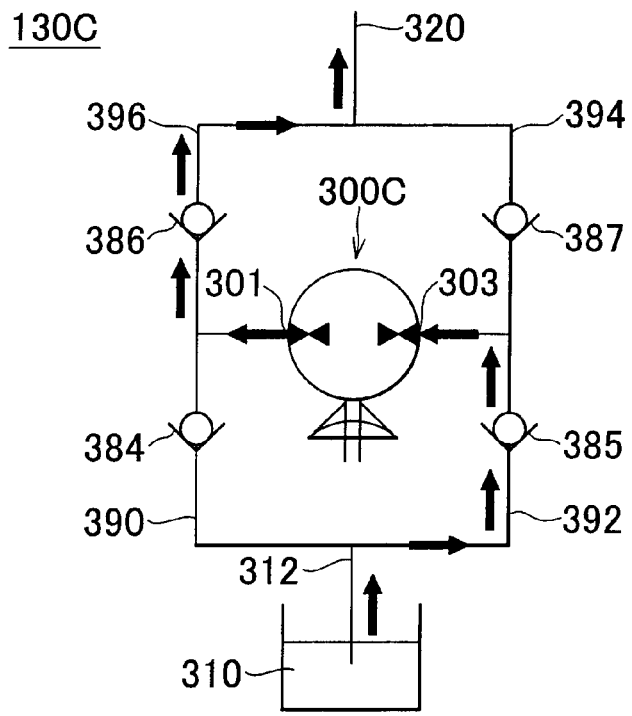

FIGS. 5A and 5B are views schematically showing the structure and operation of an oil supply apparatus 130C that can be applied to a wheel assembly with an in-wheel motor according to a third example embodiment of the invention. The structure other than the oil supply apparatus 130C in the wheel assembly with an in-wheel motor according to the third example embodiment is the same as it is in the first example embodiment described above. Therefore, in the following description the constituent elements in the third example embodiment that are the same as those in the foregoing first example embodiment will be denoted by the same reference numerals and descriptions of those elements will be omitted.

The oil supply apparatus 130C includes an oil pump 300C, connecting flow paths 390 and 394 of a first system, connecting flow paths 392 and 396 of a second system, and four check valves 384, 385, 386, and 387.

Similar to the piston pump and the centrifugal pump described above, the oil pump 300C is driven by rotational output of the motor 700. However, the oil pump 300C differs from the piston pump and the centrifugal pump described above in that it is a type of pump in which the direction in which oil is discharged when the motor 700 is rotating in the forward direction is different than the direction in which oil is discharged when the motor 700 is rotating in the reverse direction. That is, the oil pump 300C is a type of pump in which the inlet port and the outlet port reverse when the motor 700 changes between forward rotation and reverse rotation. The oil pump 300C may be any one of a variety of kinds of gear pumps, such as a trochoid pump, an external gear pump, or an internal gear pump (with or without a crescent-shaped partition), or another type of hydraulic pump such as a vane pump, for example.

The connecting flow paths 390 and 394 of the first system are flow paths which are used when the motor 700 is rotating in the forward direction, and are formed in the knuckle 400 just like the suction path 312. The connecting flow path 390 is a flow path that connects (i.e., provides communication between) a port 301 of the oil pump 300C which serves as an inlet port when the motor 700 is rotating in the forward direction (hereinafter, the port 301 will be referred to as "inlet port 301" when the motor 700 is rotating in the forward direction) with the suction path 312. The connecting flow path 394 is a flow path that connects (i.e., provides communication between) another port 303 of the oil pump 300C which serves as an outlet port when the motor 700 is rotating in the forward direction (hereinafter, the port 303 will be referred to as "outlet port 303"when the motor 700 is rotating in the forward direction) with the oil supply flow path 320.

The connecting flow paths 392 and 396 of the second system are flow paths which are used when the motor 700 is rotating in the reverse direction, and are formed in the knuckle 400 just like the suction path 312. The connecting flow path 392 is a flow path that connects (i.e., provides communication between) the port 303 of the oil pump 300C which serves as an inlet port when the motor 700 is operating in the reverse direction (hereinafter, the port 303 will be referred to as "inlet port 303" when the motor 700 is rotating in the reverse direction) with the suction path 312. The connecting flow path 396 is a flow path that connects (i.e., provides communication between) the port 301 of the oil pump 300C which serves as an outlet port when the motor 700 is operating in the reverse direction (hereinafter, the port 301 will be referred to as "outlet port 301" when the motor 700 is rotating in the reverse direction) with the oil supply flow path 320.

Incidentally, the connecting flow paths 390 and 392 may be formed as part of the suction path 312. That is, the suction path 312 may divide or branch off into two systems, one of which connects to the inlet/outlet port 301 of the oil pump 300C and the other of which connects to the inlet/outlet port 303 of the oil pump 300C.

The check valve 384 is provided in the connecting flow path 390. The check valve 384 is a one-way valve that allows oil to only flow from the oil tank 310 toward the oil pump 300C.

Similarly, the check valve 385 is provided in the connecting flow path 392. The check valve 385 is a one-way valve that allows oil to only flow from the oil tank 310 toward the oil pump 300C.

The check valve 386 is provided in the connecting flow path 396. The check valve 386 is also a one-way valve that allows oil to only flow from the oil pump 300C toward the motor 700 and the reduction mechanism 200 via the oil supply flow path 320.

Similarly, the check valve 387 is provided in the connecting flow path 394. The check valve 387 is a one-way valve that allows oil to only flow from the oil pump 300C toward the motor 700 and the reduction mechanism 200 via the oil supply flow path 320.

Next, the operation of the foregoing oil supply apparatus 130C will be described.

When the motor is rotating in the forward direction, the check valves 384, 385, 386, and 387 operate such that the connecting flow paths 390 and 394 of the first system come into use. More specifically, as shown by the arrows in FIG. 5A, the oil pump 300C draws up oil from within the oil tank 310 via the suction path 312 and the connecting flow path 390. Oil that was drawn in through the inlet port 301 is then discharged from the outlet port 303 to the oil supply flow path 320 via the connecting flow path 394. The oil discharged to the oil supply flow path 320 is then supplied to cool the motor 700 and lubricate the reduction mechanism 200, as described above.

On the other hand, when the motor is rotating in the reverse direction, the check valves 384, 385, 386, and 387 operate such that the connecting flow paths 392 and 396 of the second system come into use. More specifically, as shown by the arrows in FIG. 5B, the oil pump 300C draws up oil from within the oil tank 310 via the suction path 312 and the connecting flow path 392. Oil that was drawn in through the inlet port 303 is then discharged from the outlet port 301 to the oil supply flow path 320 via the connecting flow path 396. The oil discharged to the oil supply flow path 320 is then supplied to cool the motor 700 and lubricate the reduction mechanism 200, as described above.

According to the third example embodiment described above, the two system flow path structure having a communication control apparatus (i.e., the check valves 384, 385, 386, and 387) enables oil to be stably supplied to the motor 700 and the reduction mechanism 200 regardless of whether the motor 700 is operating in the forward direction or the reverse direction without changing the direction in which oil is discharged from the oil supply apparatus 130C (i.e., without changing the overall direction in which oil is discharged from the circuit) even when using the oil pump 300C in which the direction of oil discharge reverses when the direction of rotation of the motor 700 changes between forward and reverse.

FIG. 6 is a view schematically showing the structure of an oil supply apparatus 130C' according to a modified example of the third example embodiment. The constituent elements of the oil supply apparatus 130C' that are the same as the constituent elements described with reference to FIG. 5 will be denoted by the same reference numerals and descriptions of those elements will be omitted.

The oil supply apparatus 130C' according to this modified example differs from the oil supply apparatus 130C described with reference to FIG. 5 in that the oil supply apparatus 130C' does not have the check valves 384 and 385, but instead has a three-port three-position valve 370 as a direction-control valve. This three-port three-position valve 370 is driven by a solenoid and controlled by a control apparatus, not shown, to allow communication between the suction path 312 and the connecting flow path 390 when the motor 700 is rotating in the forward direction, and allow communication between the suction path 312 and the connecting flow path 392 when the motor is rotating in the reverse direction. Accordingly, similar to the oil supply apparatus 130C described with reference to FIG. 5, the two system flow path structure having a communication control apparatus (i.e., the check valves 384 and 385 and the three-port three-position valve 370) enables oil to be stably supplied to the motor 700 and the reduction mechanism 200 regardless of whether the motor 700 is operating in the forward direction or the reverse direction without changing the direction in which oil is discharged from the oil supply apparatus 130C' even when using the oil pump 300C in which the direction of oil discharge reverses when the direction of rotation of the motor 700 changes between forward and reverse.

Incidentally, in this modified example, the three-port three-position valve 370 replaces the check valves 384 and 385 described with reference to FIG. 5. However, alternatively or in addition, a similar three-port three-position valve may also replace the check valves 386 and 387 described with reference to FIG. 5.

[Fourth Example Embodiment]

Figure 7:
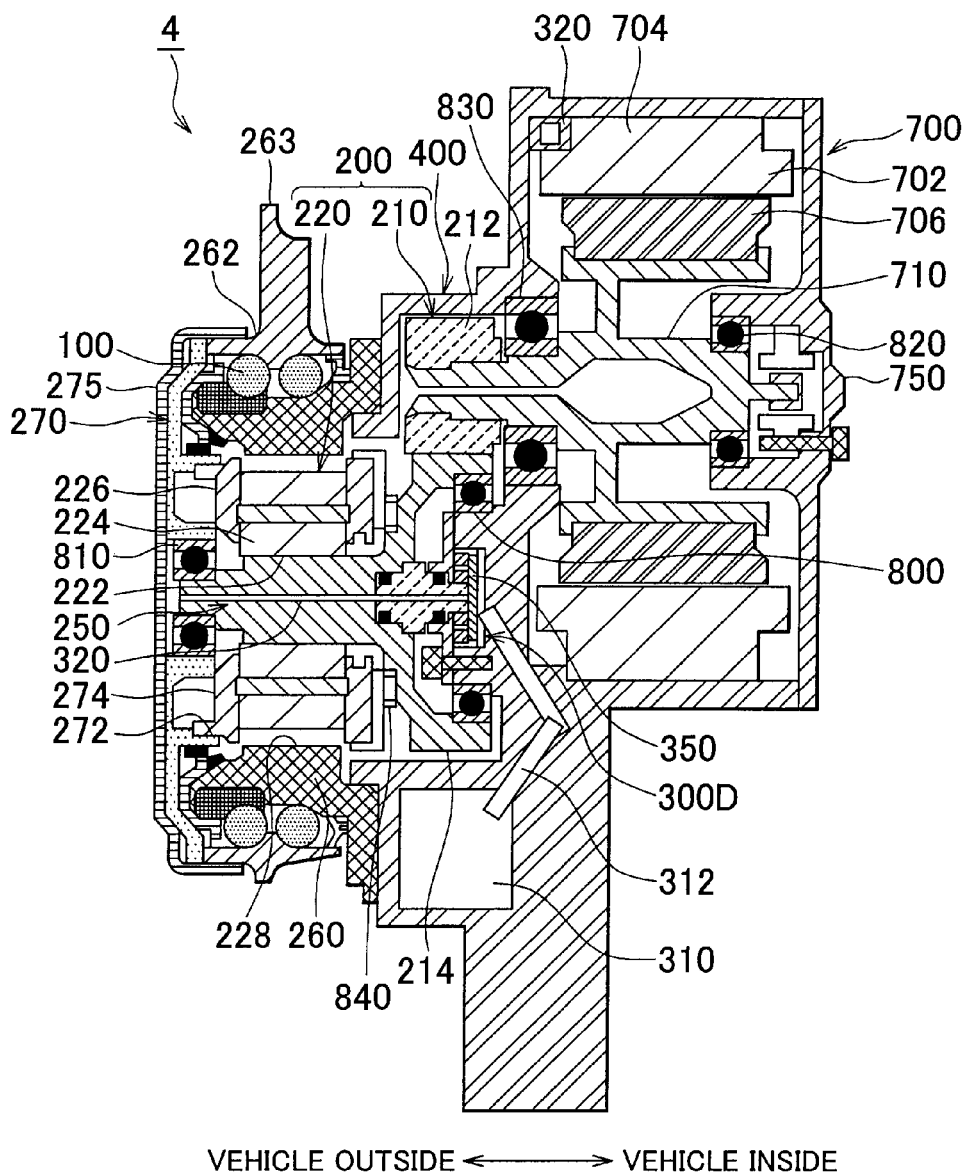
FIG. 7 is a sectional view of the main structure of a wheel assembly with an in-wheel motor according to a fourth example embodiment of the invention.

FIG. 7 is a sectional view of the main structure of a wheel assembly 4 with an in-wheel motor according to a fourth example embodiment of the invention. This fourth example embodiment differs from the first example embodiment described above in that an oil supply apparatus 130D is provided with a movable port. The structure other than the oil supply apparatus 130D in the wheel assembly 4 with an in-wheel motor according to the fourth example embodiment is the same as it is in the first example embodiment described above. Therefore, in the following description the constituent elements in the fourth example embodiment that are the same as those in the foregoing first example embodiment will be denoted by the same reference numerals and descriptions of those elements will be omitted.

The oil supply apparatus 130D includes an oil pump 300D which includes a movable port member 350.

Similar to the piston pump and the centrifugal pump described above, the oil pump 300D is driven by rotational output of the motor 700. However, the oil pump 300D differs from the piston pump and the centrifugal pump described above in that it is a type of pump in which the direction in which oil is discharged when the motor 700 is rotating in the forward direction is different than the direction in which oil is discharged when the motor 700 is rotating in the reverse direction. A specific example of the oil pump 300D is a trochoid pump (see FIGS. 9A and 9B) as shown in the drawing, which is preferable, but the oil pump 300D may be any one of a variety of kinds of gear pumps, such as an external gear pump or an internal gear pump (with or without a crescent-shaped partition), or another type of hydraulic pump such as a vane pump, for example.

Figure 8:
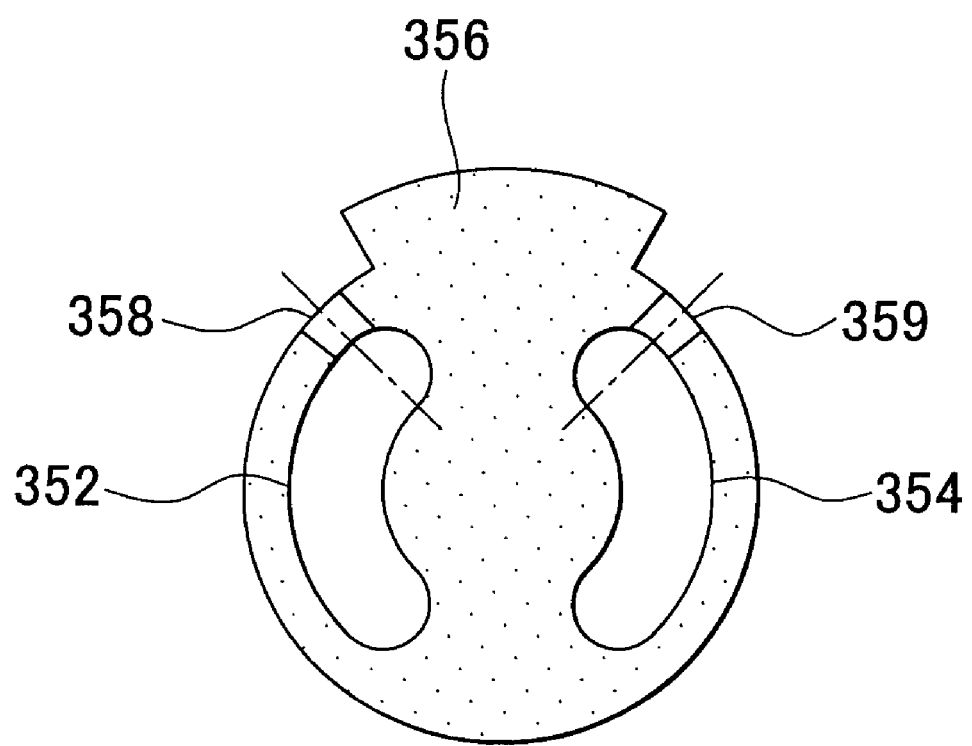
FIG. 8 is a plan view of only a movable port member.

FIG. 8 is a plan view of only the movable port member 350. This movable port member 350 includes a protruding portion 356, two ports 352 and 354, and communication holes 358 and 359, one for each of the ports 352 and 354. The movable port member 350 is essentially a flat plate shaped member of a constant thickness. The portion other than the protruding portion 356 is a generally round plate-shaped member that has a substantially constant radius.

The protruding portion 356 is a portion which protrudes to the outside in the radial direction compared with the other portion and has an arc-shaped outer periphery. That is, the protruding portion 356 is a portion that has a larger radius than the other portion of the movable port member 350 in the circumferential direction. The ports 352 and 354 are formed generally symmetrical on both sides of the protruding portion 356 so as to sandwich the protruding portion 356 in the circumferential direction. The ports 352 and 354 have long holes that extend in arcs in the circumferential direction. The communication holes 358 and 359 are formed on both sides of the protruding portion 356 in the circumferential direction. The ports 352 and 354 open in the radial direction to the outside of the movable port member 350.

FIGS. 9A and 9B are plan views of the structure and operation of the oil pump of the oil supply apparatus 130D that includes the oil pump 300D into which the movable port member 350 has been incorporated.

The oil pump 300D includes an inner rotor 333 and an outer rotor 334 which are housed inside a generally round case 330. The inner rotor 333 and the outer rotor 334 are offset with respect to one another and each have a different number of gears (i.e., the inner rotor 333 has one less than the outer rotor 334). The inner rotor 333 is connected to the vehicle inside end portion of the shaft 250 and thus rotates together with the shaft 250. That is, the inner rotor 333 is driven by the same shaft that the counter gear 214 of the reduction mechanism 200 described above is provided on.

The case 330 has an inner peripheral surface 332. This inner peripheral surface 332 includes a first inner peripheral surface 332a, a second inner peripheral surface 332b, and a third inner peripheral surface 332c, as shown in FIGS. 9A and 9B. The first inner peripheral surface 332a has a radius that corresponds to the outer radius of the protruding portion 356 of the movable port member 350. The second inner peripheral surface 332b has a smaller radius than the first inner peripheral surface 332a, and the third inner peripheral surface 332c has a smaller radius than the second inner peripheral surface 332b.

The second inner peripheral surface 332b is formed on both sides of the third inner peripheral surface 332c so as to sandwich the third inner peripheral surface 332c in the circumferential direction. An outlet hole 335 that extends through in the radial direction to the outside of the case 330 is formed in one of the second peripheral surfaces 332b and an inlet hole 336 that extends through in the radial direction to the outside of the case 330 is formed in the other second inner peripheral surface 332b. Accordingly, the space in the case 330 is communicated with the outside of the case 330 via the outlet hole 335 and the inlet hole 336. The outlet hole 335 opens to the oil supply flow path 320 (not shown in FIGS. 9A and 9B) described above, while the intake hole 336 opens to the suction path 312 (also not shown in FIGS. 9A and 9B) described above.

The radius of the third inner peripheral surface 332c corresponds to the outer radius of the portion of the movable port member 350 other than the protruding portion 356. Accordingly, the third inner peripheral surface 332c contacts, in the radial direction, the outer peripheral surface of part of the portion of the movable port member 350 other than the protruding portion 356. The third inner peripheral portion 332c is positioned between the outlet hole 335 and the inlet hole 336, as described above. Therefore, the third inner peripheral surface 332c, in cooperation with the portion of the movable port member 350, i.e., a portion other than the protruding member 356, that contacts that surface, serves to prevent oil from flowing directly from the inlet hole 336 to the outlet hole 335 via the space between the movable port member 350 and the inner peripheral surface 332 of the case 330.

Incidentally, the case 330 may be formed of a separate member from the knuckle 400, which is then incorporated into the knuckle 400, or it may be formed by the knuckle 400 itself. In the latter case, a generally cylindrical concave portion (i.e., a cavity) that has the same structure as the structure of the inside of the case 330 described above may be formed in the knuckle 400, and the movable port member 350, the inner rotor 333, and the outer rotor 334 may be housed in that concave portion.

The movable port member 350 described above is mounted in the case 330 and placed on the side surface of the inner rotor 333 and the outer rotor 334. When assembled, the outer peripheral surface of the protruding portion 356 of the movable port member 350 contacts the first inner peripheral surface 332a of the case 330, as shown in FIGS. 9A and 9B. Also, when assembled, the ports 352 and 354 of the movable port member 350 are communicated via the space between the inner rotor 333 and the outer rotor 334 (hereinafter simply referred to as the "space between the gears").

In the foregoing structure, a step in the radial direction is formed between the second inner peripheral surface 332b and the first inner peripheral surface 332a of the case due to the difference in the radii of those two surfaces 332b and 332a. This step acts as a stopper portion 338 that stops the movable port member 350 from rotating at an appropriate position, as will be described later. Also, according to a port position reversing function which will be described below, each of the two ports 352 and 354 of the movable port member 350 is made to correspond in a one-on-one relationship with one of the holes, i.e., either the outlet hole 335 or the inlet hole 336, in the case 330 when the motor 700 is rotating in the forward direction as well as when the motor 700 is rotating in the reverse direction. Hereinafter, the port 352 which is made to correspond to the outlet hole 335 will be referred to as the "outlet port 352" and the port 354 which is made to correspond to the inlet hole 336 will be referred to as the "inlet port 354".

Next, the operation of the foregoing oil supply apparatus 130D will be described.

As shown in FIG. 9A, when the motor 700 is rotating in the forward direction, the inner rotor 333 and thus the outer rotor 334 rotates in the direction corresponding to forward rotation of the motor 700 (i.e., clockwise in the example shown). At this time, friction is generated between the side surfaces of the inner rotor 333 and the outer rotor 334 in the movable port member 350, which results in rotational torque being applied in the same direction as the direction in which the inner rotor 333 and the outer rotor 334 rotate but the protruding portion 356 of the movable port member 350 is restricted at the position where it abuts in the circumferential direction against the stopper portion 338. That is, further rotation of the movable port member 350 at the position shown in FIG. 9A is restricted by the stopper portion 338.

As shown in FIG. 9A, during forward rotation, the inlet port 354 of the movable port member 350 is communicated with the inlet hole 336 of the case 300 via the communication hole 359 and a gap G2 in the radial direction between the outer peripheral surface of the movable port member 350 and the second inner peripheral surface 332b of the case 330.

Also, during forward rotation, the outlet port 352 of the movable port member 350 is communicated with the outlet hole 335 of the case 300 via the communication hole 358 and a gap G1 in the radial direction between the outer peripheral surface of the movable port member 350 and the first inner peripheral surface 332a of the case 330. Incidentally, during forward rotation, the communication hole 359 of the movable port member 350 comes to substantially the same circumferential position as the inlet hole 336 of the case 330, while the communication hole 358 of the movable port member 350 comes to a position that is offset approximately 180 degrees in the circumferential direction from the outlet hole 335 of the case 330. Therefore, the gap G1 is formed spanning across a circumferential area approximately 180 degrees along the first inner peripheral surface 332a of the case 330, as shown in FIG. 9A.

As shown in FIG. 9A, during forward rotation, the inlet port 354 of the movable port member 350 is positioned in a circumferential area where the gap between the inner rotor 333 and the outer rotor 334 becomes wider as the inner rotor 333 and the outer rotor 334 rotate. Meanwhile, the outlet port 352 of the movable port member 350 is positioned in a circumferential area where the gap between the inner rotor 333 and the outer rotor 334 becomes narrower as the inner rotor 333 and the outer rotor 334 rotate.

Accordingly, when the motor 700 is rotating in the forward direction, the oil in the oil tank 310 is drawn into the case 330 via the suction path 312 (not shown in FIGS. 9A and 9B) and the inlet hole 336 of the case 330, as shown by the thin arrow in FIG. 9A. Further, the oil is drawn into the gap between the inner rotor 333 and the outer rotor 334 via the communication hole 359 and the inlet port 354 of the movable port member 350. Accordingly, the oil that is drawn in is then caught between the inner rotor 333 and the outer rotor 334 and carried to the outlet port 352 side of the movable port member 350, during which time the pressure of that oil increases as the volume of the gap between the inner rotor 333 and the outer rotor 334 decreases. The thus pressurized oil is then discharged from the gap between the inner rotor 333 and the outer rotor 334 to the oil supply flow path 320 (not shown in FIGS. 9A and 9B), and thus the motor 700 and the reduction mechanism 200 (also not shown in FIGS. 9A and 9B), via the outlet port 352 of the movable port member 350, the communication hole 358, the gap G1, and the outlet hole 335 of the case 330.

On the other hand, when the motor 700 is rotating in the reverse direction, the inner rotor 333 and thus the outer rotor 334 rotates in the direction corresponding to reverse rotation of the motor 700 (i.e., counterclockwise in the example shown). At this time, friction is generated between the side surfaces of the inner rotor 333 and the outer rotor 334 in the movable port member 350, which results in rotational torque being applied in the same direction as the direction in which the inner rotor 333 and the outer rotor 334 rotate, such that the movable port member 350 rotates from the position shown in FIG. 9A to the position shown in FIG. 9B. That is, the movable port member 350 rotates to a position where the side surface (i.e., the leading side surface in the direction of rotation) of the protruding portion 356 of the movable port member 350 abuts against the stopper portion 338 in the circumferential direction. Once the movable port member 350 has reached that position, it is restricted from rotating further by the stopper portion 338.

As shown in FIG. 9B, during reverse rotation, the inlet port 354 of the movable port member 350 is communicated with the inlet hole 336 of the case 300 via the communication hole 359 and a gap G3 in the radial direction between the outer peripheral surface of the movable port member 350 and the first inner peripheral surface 332a of the case 330. Incidentally, during reverse rotation, the communication hole 358 of the movable port member 350 comes to substantially the same circumferential position as the outlet hole 335 of the case 330, while the communication hole 359 of the movable port member 350 comes to a position that is offset approximately 180 degrees in the circumferential direction from the inlet hole 336 of the case 330. Therefore, the gap G3 is formed spanning across a circumferential area approximately 180 degrees along the first inner peripheral surface 332a of the case 330, as shown in FIG. 9B.

Also, during reverse rotation, the outlet port 352 of the movable port member 350 is communicated with the outlet hole 335 of the case 300 via the communication hole 358 and a gap G4 in the radial direction between the movable port member 350 and the second inner peripheral surface 332b of the case 330.

It should be noted that during reverse rotation, as shown in FIG. 9B, the inlet port 354 of the movable port member 350 comes to a position in which the phase is reversed from that of the position shown in FIG. 9A. That is, the phase of the inlet port 354 (i.e., the position in the circumferential direction) is reversed 180 degrees. Accordingly, during reverse rotation, the inlet port 354 of the movable port member 350 is positioned in a circumferential area in which the gap between the inner rotor 333 and the outer rotor 334 becomes wider as the inner rotor 333 and the outer rotor 334 rotate, just like during forward rotation described above. Meanwhile, the outlet port 352 of the movable port member 350 also comes to a position where the phase is reversed from that of the position shown in FIG. 9A. Accordingly, during reverse rotation, the outlet port 352 of the movable port member 350 is positioned in a circumferential area in which the gap between the inner rotor 333 and the outer rotor 334 becomes narrower as the inner rotor 333 and the outer rotor 334 rotate, just like during forward rotation described above.

Accordingly, when the motor 700 is rotating in the reverse direction, the oil in the oil tank 310 is drawn into the case 330 via the suction path 312 (not shown in FIGS. 9A and 9B) and the inlet hole 336 of the case 330, as shown by the thin arrow in FIG. 9B. Further, the oil is drawn into the gap between the inner rotor 333 and the outer rotor 334 via the gap G3, the communication hole 359 and the inlet port 354 of the movable port member 350. Accordingly, the oil that is drawn in is then caught between the inner rotor 333 and the outer rotor 334 and carried to the outlet port 352 side of the movable port member 350, during which time the pressure of that oil increases as the volume of the gap between the inner rotor 333 and the outer rotor 334 decreases. The thus pressurized oil is then discharged from the gap between the inner rotor 333 and the outer rotor 334 to the oil supply flow path 320 (not shown in FIGS. 9A and 9B), and thus the motor 700 and the reduction mechanism 200 (also not shown in FIGS. 9A and 9B), via the outlet port 352 of the movable port member 350, the communication hole 358, the gap G4 in the radial direction between the movable port member 350 and the second inner peripheral surface 332b of the case 330, and the outlet hole 335 of the case 330.

According to the fourth example embodiment described above, oil is able to be stably supplied to the motor 700 and the reduction mechanism 200 irrespective of whether the motor 700 is rotating in the forward direction or in the reverse direction without changing the direction in which the oil is discharged from the oil supply apparatus 130D (i.e., without changing the overall direction in which oil is discharged from the circuit) by using the port position reversing function of the movable port member 350 even when using the oil pump 300D in which the direction of oil discharge reverses when the direction of rotation of the motor 700 changes between forward and reverse.

While example embodiments of the invention have been illustrated in detail above, it is to be understood that the invention is not limited to the illustrated embodiments, but may be embodied with various changes, modifications or improvements without departing from the spirit and scope of the invention.

For example, the invention is not limited to the structure of the oil supply flow path 320 and the position in which the oil pump 300A is arranged and the like described above in the foregoing example embodiments. To the contrary, the invention can also be applied to a wheel assembly with an in-wheel motor having any of various oil supply flow path structures and positions in which the oil pump is arranged. For example, the invention can also be applied to the wheel assembly with an in-wheel motor having the oil supply flow path structure and oil pump arrangement such as those described in the related art of JP-A-2005-73364.

Also, in the foregoing example embodiments, the motor 700 and the reduction mechanism 200 together make up the wheel driving apparatus. However, the invention may also be applied to a wheel assembly with a so-called direct drive type in-wheel motor in which only the motor 700 makes up the wheel driving apparatus. Also, the invention is not limited to the offset arrangement of the motor 700 and the reduction mechanism 200 as described in the foregoing example embodiments. That is, the invention can also be applied to a wheel assembly with an in-wheel motor in which the motor and the reduction mechanism are arranged on the same axis like the related art described in JP-A-2005-73364.

Also, in the foregoing example embodiments, the reduction mechanism 200 realizes a two step reduction. However, the reduction mechanism may also realize a one step reduction or a three or more step reduction. Also, the reduction mechanism 200 realizes the two step reduction by the counter gear mechanism 210 and the planetary gear set 220, but other combinations are also possible. For example, a two step reduction may be realized by arranging planetary gear sets in series.

Also, in the foregoing example embodiment, the oil from the oil pump 300A and the like is used to cool the motor 700 and lubricate the reduction mechanism 200, but it may also be supplied to do only one or the other. Alternatively, the oil from the oil pump 300A may also be led to a brake caliper and used to generate hydraulic brake pressure.

Further, in the foregoing example embodiments, the motor 700 is an inner rotor type motor but it may also be an outer rotor type motor.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A wheel assembly with an in-wheel motor comprising:
a rotor arranged on an inner peripheral side of a stator;
a driving gear coupled to an output shaft of the rotor;
a counter gear in mesh with the driving gear, wherein the counter gear has a larger diameter than a diameter of the driving gear;
an oil supply apparatus that is driven by output of a forward rotation and a reverse rotation of the motor via the counter gear,
wherein the oil supply apparatus draws up oil from an oil tank via a suction path and supplies the oil to the in-wheel motor when the motor is rotating in a forward direction as well as when the motor is rotating in a reverse direction, and
wherein the counter gear extends radially around the oil supply apparatus.

2. The wheel assembly with an in-wheel motor according to claim 1, wherein the oil supply apparatus includes a piston pump.

3. The wheel assembly with an in-wheel motor according to claim 2, wherein the piston pump includes an eccentric cam that is rotatably driven by rotational output of the motor, and a piston that moves in a reciprocating manner in conjunction with the rotation of the eccentric cam.

4. The wheel assembly with an in-wheel motor according to claim 3, wherein the eccentric cam is connected to the counter gear on a vehicle inside portion.

5. The wheel assembly with an in-wheel motor according to claim 1, wherein the oil supply apparatus includes a centrifugal pump.

6. The wheel assembly with an in-wheel motor according to claim 1, wherein the oil supply apparatus includes a pump that discharges oil in one direction when the motor is rotating in the forward direction and discharges the oil in another direction when the motor is rotating in the reverse direction; two systems of flow paths corresponding to the different directions in which the pump discharges the oil; and a communication control apparatus that controls the communicating state of the two systems of flow paths with respect to the pump.

7. The wheel assembly with an in-wheel motor according to claim 6, wherein a first system from among the two systems of flow paths includes an outlet side connecting flow path that communicates an outlet port of the pump during forward rotation with an oil supply flow path to the in-wheel motor, and an inlet side connecting flow path that communicates an inlet port of the pump during forward rotation with the oil tank; a second system from among the two systems of flow paths includes an outlet side connecting flow path that communicates an outlet port of the pump during reverse rotation with the oil supply flow path, and an inlet side connecting flow path that communicates an inlet port of the pump during reverse rotation with the oil tank; and the communication control apparatus includes a check valve provided for each outlet side connecting flow path of the first system and the second system and each inlet side connecting flow path of the first system and the second system.

8. The wheel assembly with an in-wheel motor according to claim 6, wherein a first system from among the two systems of flow paths includes an outlet side connecting flow path that communicates an outlet port of the pump during forward rotation with an oil supply flow path to the in-wheel motor, and an inlet side connecting flow path that communicates an inlet port of the pump during forward rotation with the oil tank; a second system from among the two systems of flow paths includes an outlet side connecting flow path that communicates an outlet port of the pump during reverse rotation with the oil supply flow path, and an inlet side connecting flow path that communicates an inlet port of the pump during reverse rotation with the oil tank; and the communication control apparatus includes a check valve provided for each outlet side connecting flow path of the first system and the second system, and a directional control valve that selectively communicates one of the inlet side connecting flow paths of the first system and the second system with the oil tank.

9. The wheel assembly with an in-wheel motor according to claim 1, wherein the oil supply apparatus includes a pump that discharges oil in one direction when the motor is rotating in the forward direction and discharges the oil in another direction when the motor is rotating in the reverse direction; and the pump has a rotating member that rotates together with the forward rotation and the reverse rotation of the motor.

10. The wheel assembly with an in-wheel motor according to claim 1, wherein the oil supply apparatus includes a pump that discharges oil in one direction when the motor is rotating in the forward direction and discharges the oil in another direction when the motor is rotating in the reverse direction; the pump includes a movable port member that defines an outlet port and an inlet port; and the movable port member moves, in conjunction with the forward rotation and the reverse rotation of the motor, between a first position and a second position in which the outlet port and the inlet port are reversed.

11. The wheel assembly with an in-wheel motor according to claim 10, wherein the pump is a gear pump, the movable port member is arranged on a gear side surface of the gear pump and moves between the first position and the second position in conjunction with the forward rotation and reverse rotation of the motor via friction between the movable port member and the gear side surface of the gear pump, and the pump includes a restricting portion that restricts the movement of the movable port member to the first position and the second position.

12. The wheel assembly with an in-wheel motor according to claim 10, wherein the pump includes a fixed case in which is formed an outlet hole that is connected to an oil supply flow path to the in-wheel motor and an inlet hole that is communicated with the oil tank; the movable port member is arranged within the case; and the movable port member and the case are structured such that the outlet port of the movable port member is communicated with the outlet hole of the case and the inlet port of the movable port member is communicated with the inlet hole of the case when the movable port member is in the first position as well as the second position.

13. The wheel assembly with an in-wheel motor according to claim 12, wherein the movable port member has an arc-shaped protruding portion that has a larger radius than another portion of the movable port member; and an inner peripheral surface of the case is formed by a first inner peripheral surface that has a radius that corresponds to the outer radius of the protruding portion of the movable port member, a second inner peripheral surface that has a smaller radius than the first inner peripheral surface, and a third inner peripheral surface that has a smaller radius than the second inner peripheral surface.

14. The wheel assembly with an in-wheel motor according to claim 13, wherein the second inner peripheral surface is formed on both sides of the third inner peripheral surface so as to sandwich the third inner peripheral surface, and the outlet hole and the inlet hole are each formed in the second inner peripheral surface.

15. The wheel assembly with an in-wheel motor according to claim 1, wherein
a sun gear is formed on one end of a shaft and the counter gear is formed on an other end of the shaft in a width direction of the vehicle.

16. The wheel assembly with an in-wheel motor according to claim 15, wherein the one end of the shaft on which the sun gear is formed is rotatably supported by a knuckle via a bearing.

17. The wheel assembly with an in-wheel motor according to claim 15, wherein the oil from the oil supply apparatus is output to an oil supply flow path provided axially to the shaft.

18. The wheel assembly with an in-wheel motor according to claim 1, wherein the counter gear includes an outer circumferential portion that meshes with the driving gear, and
wherein the oil supply apparatus is inside the counter gear in a radial direction from the outer circumferential portion.

19. A wheel assembly with an in-wheel motor comprising:
a rotor arranged on an inner peripheral side of a stator;
a driving gear coupled to an output shaft of the rotor;
a counter gear in mesh with the driving gear, wherein the counter gear has a larger diameter than a diameter of the driving gear;
an oil supply apparatus that is driven by output of a forward rotation and a reverse rotation of the motor via the counter gear, wherein
the oil supply apparatus is formed such that oil in an oil tank is supplied to the in wheel motor when the motor is rotating in a forward direction as well as when the motor is rotating in a reverse direction,
the oil supply apparatus includes a piston pump,
the piston pump includes an eccentric cam that is rotatably driven by rotational output of the motor, and a piston that moves in a reciprocating manner in conjunction with the rotation of the eccentric cam,
a sun gear is formed on one end of a shaft and the counter gear is formed on an other end of the shaft in a width direction of the vehicle, and the oil supply apparatus is provided radially inward from the counter gear.

20. The wheel assembly with an in-wheel motor according to claim 19, wherein the eccentric cam is connected to the shaft on a vehicle inside portion.

* * * * *